(12) United States Patent
S et al.

(10) Patent No.: US 12,613,870 B2
(45) Date of Patent: Apr. 28, 2026

(54) DATA EXTRACTION, OBJECT CREATION, AND QUERY SYSTEM LEVERAGING LLM CAPABILITIES

(71) Applicant: SAP SE, Walldorf (DE)

(72) Inventors: Shwetha H S, Bengaluru (IN); Ranjith Pr, Wayanad (IN); Rathidevi Shanmugam, Bengaluru (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/796,429

(22) Filed: Aug. 7, 2024

(65) Prior Publication Data

US 2026/0044510 A1 Feb. 12, 2026

(51) Int. Cl.
| | |
|---|---|
| *G06F 16/00* | (2019.01) |
| *G06F 16/21* | (2019.01) |
| *G06F 16/2455* | (2019.01) |
| *G06F 16/25* | (2019.01) |

(52) U.S. Cl.
CPC ...... *G06F 16/24553* (2019.01); *G06F 16/212* (2019.01); *G06F 16/258* (2019.01)

(58) Field of Classification Search
CPC ............................ G06F 16/212; G06F 16/258
See application file for complete search history.

(56) References Cited

U.S. PATENT DOCUMENTS

| | | | | |
|---|---|---|---|---|
| 2009/0228428 | A1* | 9/2009 | Dan ...................... | G06F 16/907 |
| 2017/0132300 | A1* | 5/2017 | Sekar ................... | G06F 16/254 |
| 2020/0159855 | A1* | 5/2020 | Iyer ................... | G06F 16/24522 |
| 2024/0061817 | A1* | 2/2024 | Sagar ................... | G06F 16/211 |
| 2025/0005299 | A1* | 1/2025 | Padmanabhan ....... | G06F 16/335 |

* cited by examiner

*Primary Examiner* — Cheryl Lewis
(74) *Attorney, Agent, or Firm* — Sterne, Kessler, Goldstein & Fox P.L.L.C.

(57) ABSTRACT

Disclosed herein are various embodiments for a sensitive data management system. An embodiment operates by receiving a request to generate a new data object based on a file comprising unstructured data. Raw data is extracted from the file, the raw data comprising a string comprising the unstructured data. A prompt for a large language model (LLM) is generated, the prompt corresponding to creating a mapping between the raw data and fields for the data object. A mapping between at least a subset of the fields and the raw data is received from the LLM. The mapping is for display via a user interface, an approval of the mapping is received, and the data object is generated in a data storage system responsive to receiving the approval.

20 Claims, 5 Drawing Sheets

100

200

| | A | B | C | D | E | F | G | H | I | J | K |
|---|---|---|---|---|---|---|---|---|---|---|---|
| 1 | FIRSTNAME | LASTNAME | HOUSE_NO | STREET | CITY | COUNTRY | POSTL_COD1 | TEL_NO | FAX_NO | E_MAIL | |
| 2 | Sidd | Ahamed | 11180 | State Bridge Road | Georgia | US | 30022 | 678 685-8650 | 866 431-2320 | sidd.a@vdartinc.com | |
| 3 | Hari | Shetty | 154 | AECS Layout | Bangalore | IN | 560066 | 9998887773 | 628 292-9832 | pooja.shetty@gmail.com | |
| 4 | Meera | Rao | 27 | Gangothri Layout | Mangalore | IN | 574199 | 9886098860 | 311 123-1234 | meera.rao@gmail.com | |

Data Review

| seq_no | LASTNAME | FIRSTNAME | HOUSE_NO | STREET | CITY | COUNTRY |
|--------|----------|-----------|----------|--------|------|---------|
| 1 | Ahamed | Sidd | 11180 | State Bridge Road | Georgia | US |
| 2 | Shetty | Hari | 154 | AECS Layout | Bangalore | IN |
| 3 | Rao | Meera | 27 | Gangothri Layout | Mangalore | IN |

Save Draft

FIG. 2B

Computer System 400

DATA EXTRACTION, OBJECT CREATION, AND QUERY SYSTEM LEVERAGING LLM CAPABILITIES

BACKGROUND

One of the challenges facing organizations is capturing legacy data or data that is stored in an unstructured format, and organizing the data to fit into a current data storage structure. Oftentimes the process of structuring or adding structure to unstructured data is resource consuming, manual, and subject to human errors. Despite these limitations, organizations still need to integrate the unstructured data into a structured format to make use of the data and for improved data processing tasks.

BRIEF DESCRIPTION OF THE DRAWINGS

The accompanying drawings are incorporated herein and form a part of the specification.

FIGS. 2A and 2B illustrates an example of operations related to generating a data mapping by a data extraction, object creation and query system (DQS) according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for a data extraction and object creation system One of the challenges facing organizations is capturing legacy data or data that is stored in an unstructured format, and organizing the data to fit into a current data storage structure. Oftentimes the process of structuring or adding structure to unstructured data is resource consuming, manual, and subject to human errors. Despite these limitations, organizations still need to integrate the unstructured data into a structured format to make use of the data and for improved data processing tasks.

Figure 1:
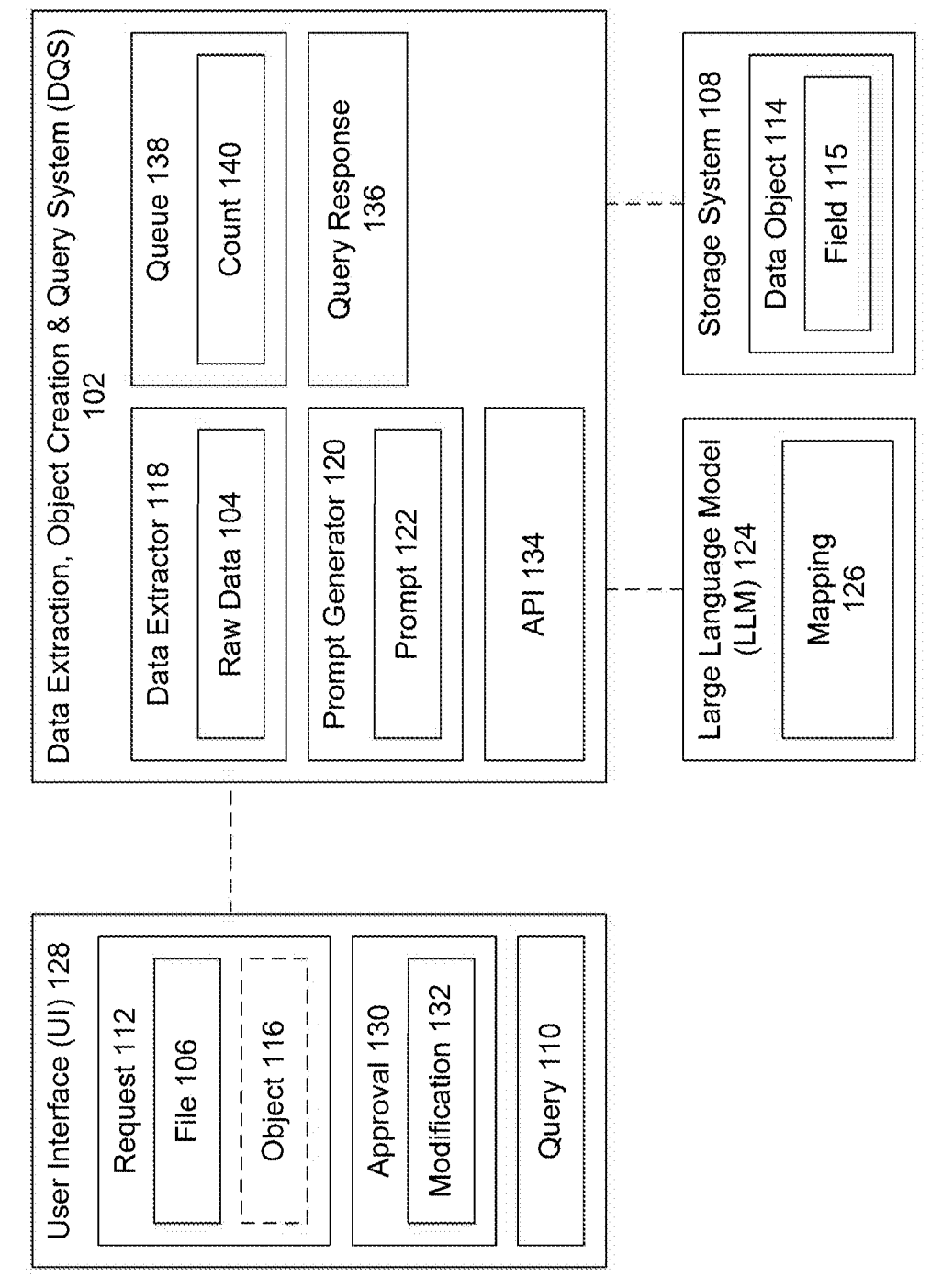
FIG. 1 is a block diagram of a data extraction, object creation and query system (DQS), according to some embodiments.

FIG. 1 is a block diagram 100 of a data extraction, object creation and query system (DQS) 102, according to some embodiments. DQS 102 may extract raw data 104 from a file 106 that includes unstructured data, and may add structure to the unstructured raw data 104 in an automated fashion that enables the data from file 106 to be stored in a structured storage system 108 and available for processing one or more queries 110.

DQS 102 may allow for both the rapid conversion of legacy data (which may include data with a structure that is different from the structure of data stored in storage system 108) and data from various unstructured data files 106 into a structured data format used to store data in storage system 108. In some embodiments, data stored in storage system 108 may be structured in accordance with a data object 114.

Data object 114 may include a structured format for data stored in storage system 108. Data object 114 may include various attributes or fields 115 which may be populated with data. In some embodiments, data object 114 may include a plurality of different data storage objects with different fields 115, functions, or other structure. For simplicity, a single data object 114 is illustrated, however it is understood that storage system 108 may host or store data in accordance with multiple, varying data objects 114.

Once stored in storage system 108, in accordance with the format, structure and/or fields 115 of data object 114, the data may be used for data processing tasks, such as responding to a query 110, and may be used to provide a more accurate query response 136, and more complete views of the data of an organization. Without the integration of this data from file 106, a query 110 executed against the data of storage system 108 would necessarily return an incomplete and potentially inaccurate response based on being executed against only a partial, incomplete, or outdated set of data (as may have been previously stored by storage system 108).

In some embodiments, DQS 102 may receive a request 112 to store data from file 106 into storage system 108. In some embodiments, the request 112 may include a request to generate a data object 114 from the data in file 106, or update the data of an existing data object 114 already stored in storage system 108.

In some embodiments, data object 114 may include a Person data object 114 which may include the fields 115: firstname, lastname, date-of-birth, address, position, company, phone number, and employeeID. Then, for example, DQS 102 may extract data from the file 106, generate a mapping 126 by assigning the extracted data to various the fields 115 of the Person data object 114, and generate a new Person data object 114 based on the mapping 126. Or, for example, DQS 102 may locate an existing person data object matching the extracted data, assign the extracted data to various fields 115, and update the mapping 126 and/or data of the existing Person data object 114.

Some other non-limiting examples of data objects 114 of storage system 108 may include a Group data object 114 and a Vehicle data object 114. The Group data object 114 may include the fields 115: Person(s) (referring to the Person data object 114), project, location, number of members, and requirements. Thus there may be relationships between different data objects (e.g., such as Person and Group). The Vehicle data object 114 may include the fields 115: manufacturer, year, model, mileage, and seating capacity.

In some embodiments, file 106 may include any data that is unstructured or otherwise structured in a manner different from the structure of a data object 114 as stored across one or more files. For example, file 106 may include various legacy data stored in a spreadsheet (structure), and the request 112 may include a command to store that spreadsheet data in a database with different column names (storage system 108) and/or with a structure defined by data object 114 (e.g., across one or more tables and columns of a database). Thus the structure of data object 114 may vary from the structure of the spreadsheet. In some embodiments, DQS 102 may extract the data from the spreadsheet as raw data 104 and restructure or add structure to the raw data 104 in accordance with data object 114 (e.g., by assigning the raw data 104 to the various fields of a data object 114).

In some embodiments, the request 112 may include a pointer or address to a file 106 (or collection of files) with data in it that has a structure different from data object 114, and may optionally include an object value 116 indicating which data object(s) 114 are to be generated from the data in the file 106. For example, if there are multiple different types of data objects 114 with similar fields 115 such as Supervisor and Employee, both of which may include fields 115 such as firstname, lastname, employeeID, project, seniority, address, phonenumber, email, etc, a user may specify via object value 116 which data object (e.g., supervisor or employee) is to be created. The object value 116 may be an optional field, which if left unspecified, then DQS 102 may select its best estimation as to which data object 114 to create.

If it is unclear which data object 114 to create from raw data 104, DQS 102 may rely on past processing or statistics such as selecting the most used data object 114, or most recently created data object 114. In some embodiments, DQS 102 may create two different data objects 114 from the same data (DQS 102 determines the data is equally applicable to both), and prompt a user (via user interface 128) to select which data object 114 is to be created during a review/approval process.

In some embodiments, a data extractor 118 may extract raw data 104 from the file 106. In some embodiments, the raw data 104 may include a string of text (e.g. alphanumeric and/or symbolic text) or data that is extracted from file 106, from which any previous structure which may have existed in file 106 is removed. Data extractor 118 may data from file 106 its native format, accounting for varying file structures, encoding schemes, and data types to generate raw data 104. In some embodiments, data extractor 118 may perform normalization on the extracted data to ensure uniformity and consistency, as part of generated raw data 104, which may include standardizing formats, resolving inconsistencies, and eliminating redundancies.

In some embodiments, raw data 104 may include different sets or groups of raw data. For example, file 106 may include a purchase order. The purchase order may include a group of information indicating a purchaser, a group of information about the product, and a group of information indicating the seller, which may be physically located in different sections on the purchase order. In some embodiments, the raw data 104 from the purchase order may include three different groups of data extracted from the purchase order (e.g., using optical character recognition (OCR) or another data extraction process) that were physically located in different areas of the purchase order (e.g., which may include an image of a physical purchase order document).

If file 106 was a spreadsheet, then each row may be indicated as a separate grouping of data in the raw data 104. In some embodiments, raw data 104 may include some alphanumeric or symbolic delimiter differentiating between different 'groups' of data, such as using an asterisk *.

In some embodiments, a prompt generator 120 may generate a prompt 122 to provide to a large language model (LLM) 124 for processing. Prompt 122 may include one or more lines of text organized across one or more documents that is particularly formatted to by understandable by an LLM 124. LLM 124 may include an artificial intelligence, machine learning, or deep learning model that is configured to execute data processing commands from plain-text (e.g., not requiring computer language or coded input). LLM 124 may include any computing system that is configured to perform processing tasks based on text-based or plain language inputs. LLM 124 may be configured to create original content from one or more inputs (e.g., such as raw data 104) in accordance with prompt 122. In some embodiments, LLM 124 may include a generative pre-training transformer (GPT).

In some embodiments, the prompt 122 may include or point to the raw data 104 as the input and request for LLM 124 to generate a mapping 126 of the raw data 104 to one or more data objects 114. In some embodiments, if the request 112 specified an object value 116, then the object value 116 may be included in prompt 122, to instruct LLM 124 to generate a mapping 126 for raw data 104 to the data object(s) 114 corresponding to object value 116. In some embodiments, object value 116 may indicate multiple data objects 114 (e.g., a subset of all the possible or supported data objects 114) which may comprise the exclusive set of data objects 114 from which LLM 124 may choose to perform a mapping 126.

When processing a sales order (e.g., file 106), the document may contain various details such as company information, shipping address, billing address, items, quantity, price, and company bank details. In some embodiments, data extractor 118 may extract the complete string of the sales order for processing. Then, for example, prompt generator 120 may specify in prompt 122 that only the business partner details, such as their name, address, phone number, and email are to be used to generate or update a data object 114.

Mapping 126 may include an assignment of the values extracted from raw data 104 to the data fields 115 of a data object 114. As noted above, each data object 114 may include various data fields 115. LLM 124 may generate a mapping 126 in which values from the raw data 104 are mapped or assigned to the various data fields 115 across one or more data objects 114 in accordance with prompt 122. In some embodiments, mapping 126 may be formatted as a JavaScript Object Notation (JSON) file.

In some embodiments, LLM 124 may return mapping 126 to DQS 102. In some embodiments, DQS 102 may format and provide the formatted mapping 126 for display via user interface 128. As discussed in greater detail below, an example mapping 126 provided for display is illustrated in FIG. 2B. This may allow a user to view, edit, reject, or approve the displayed mapping. For example, the user may provide an approval 130, which may or may not include a modification 132 to the mapping 126. Modification 132 may include an edit of the mapping 126. For example, some of the raw data 104 may have been assigned or mapped to the wrong or an unintended data field 115. A user may have an opportunity to review, approve, modify, and even reject the mapping 126, or portions of the mapping, prior to the creation of a new data object 114 in storage system 108.

Allowing the user to submit an approval 130 and/or modification(s) 132 to the mapping 126 prior to generating a new data object 114 in storage system 108, may save processing resources if there are any errors in the mapping 126. In some embodiments, the approval 130 may include a rejection of the mapping 126 such that nothing is created in storage system 108. If the user submits a modification 132, DQS 102 may update the mapping 126 accordingly to include the modification 132. In some embodiments, the modification 132 may be provided to LLM 124 to provide for training/feedback, to improve future processing tasks.

In some embodiments, hundreds, thousands, or even more different or new data objects 114 may be created from the raw data 104. In these embodiments, a user may be unable to individually review all the new records or data objects 114 in the mapping 126. In these embodiments, a user specify how many records of mapping 126 the user desires to review, and DQS 102 may then select a random sampling of the mapping 126 for user review and approval 130 or modification 132.

Upon modifying the mapping 126 in accordance with modification 132 and/or receiving approval 130, DQS 102 may call an application programming interface (API) 134 to generate one or more new data objects 114 in accordance with the modified and/or approved mapping 126. API 134 may include the various data fields 115 of a data object, various technical fields in addition to the data fields 115, and one or more functions for creating, modifying, and/or deleting a data object 114. The technical fields may include fields of data which are not provided to the user for review/approval/modification, and may include implied values derived from the raw data 104. For example, if the user provides a title of "Mr.", then LLM 124 may derive the technical field of gender as "male", or if the user enters their zip code, the LLM 124 may derive the city and state. In some embodiments, a modification 132 may cause DQS 102 to recompute one or more of the technical fields. In some embodiments, LLM 124 may be trained on the API 134 to both fill in the data fields 115 from the raw data 104 for which user approval 130 may be requested and received, and fill in the technical fields which may not be subject to user review or approval.

Once the new data object 114 has been generated and stored in storage system 108, the raw data 104 as extracted from file 106, and provided via the new data object(s) 114 may be available for query processing.

In some embodiments, DQS 102 may receive a query 110 to be performed on data stored across various data objects 114 of storage system 108. As noted above, once query 110 has been received, all the data, including raw data 104, stored in a data object 114 will be available to generate a query response 136. Query response 136 may include an indication as to which data or records of storage system 108 satisfy query 110.

In some embodiments, a request 112 may not be processed immediately, but instead, may be stored in a queue 138. Queue 138 may include a buffer or storage mechanism for storing requests 112 in a first-in, first-out, last-in, last, out, or other priority ordering. In some embodiments, queue 138 may maintain a count 140 or track which data object(s) 114 have been specified to be created by the requests 112.

For example, a count 140 may include Employee (2), Vehicle (4), Supervisor (0), Unknown (6). This count may indicate there are 2 pending requests 112 for the generation of employee data objects 114, 4 pending requests 112 for the generation of vehicle data objects 114, 0 pending requests 112 for the generation of supervisor data objects 114, and 6 pending requests 112 where the object value 116 is unknown or was not specified by a user.

In some embodiments, DQS 102 may determine which data object(s) 114 are to be processed in accordance with query 110. DQS 102 may check if any of the determined data object(s) 114 of query 110 correspond to a data object indicated by count 140 corresponding to requests 112 in queue 138. If the count 140 for the data object is greater than zero, then several alternative actions may be performed.

In some embodiments, DQS 102 may process the pending requests 112 in queue 138 corresponding to the data object of query 110 prior to execution the query 110. In continuing the example above, if the query 110 is for vehicle data, where the count is four, DQS 102 may process the pending requests 112 prior to executing the query 110.

In some embodiments, DQS 102 may request instructions from a user, via user interface 128, whether they want the outstanding requests 112 to be included in the query 110 prior to processing the pending requests 112, and may indicate how many requests 112 are pending for the data object of query 110. If the user responds yes, then DQS 102 may process the requests 112, including the raw data 104 in a data object 114 prior to processing the query 110. If the user answers no, then the query 110 may be processed without the raw data 104 of the pending requests 112 as stored in queue 138.

In some embodiments, DQS 102 may process the query 110 without the queued requests 112, and upon providing the query response 136 may indicate how many relevant outstanding relevant requests 112 were queued prior to processing the query 110. The relevant requests may include both data objects which are specified in the query 110 and those that are Unknown. The user may then be given the option to process the outstanding requests 112 and re-execute the query 110 to generate a new query response 136. The new query response 136 may also indicate whether there was any change between the initial query response 136 and the new query response 136.

In some embodiments, the query 110 and request 112 may be received together, such that it comprises an instruction to DQS 102 to first add the data from file 106 to storage system 108, as described herein, and then process the query 110 based on the updated data in storage system 108.

In some embodiments, file 106 may include a check (e.g., an image of a check) with various bank details (e.g., bank name, account number) and customer information. DQS 102 may receive a request 112 to add details from the check (file 106) to a specified data object 114 corresponding to the customer information specified on the check.

In some embodiments, DQS 102 may perform OCR or other processing to identify and extract the information from the image of the check. DQS 102 may identify the customer information from the check, and identify a corresponding data object 114 for the customer in storage system 108. DQS 102 may then generate a mapping 126 of the details from the check into one or more fields 115 of the data object 114 for the customer. The user may review and provide an approval 130 that the mapping 126 is correct, and through calling a function of API 134, DQS 102 may update the existing data object 114 for the customer in accordance with the mapping 126.

In some embodiments, file 106 may include a purchase order includes details such as product references, item descriptions, pricing information, vendor details, and the delivery address of a customer. Specifically, a section labeled SHIP-TO may include the customer details, and the goal is to use this information to create a Customer data object 114 (as specified by object value 116).

In some embodiments, all the details and information may be extracted from the purchase order into a string of raw data 104. Prompt generator 120 may generate a prompt 122 instructing LLM 124 to generate a mapping 126 between the raw data 104 and the customer data object 114. In some embodiments, data extractor 118 may be included as part of the functionality of LLM 124.

In some embodiments, file 106 may include an email. Email may be written in natural language, in which relevant data for the generation or update of a data object 114 may not be in any dedicated or specified location, but instead may be spread throughout the text of the email. LLM 124 may identify and extract information that is identified as being relevant a data object 114, and provide a mapping 126. In some embodiments, in providing the mapping 126 for display, LLM 124 may highlight or mark what information from the email was used (e.g., the email may be displayed via user interface 128) with particular words or phrases marked in various colors, highlight, bolding, or with other emphasis or indicators that the words or phrases were identified as being relevant for one or more data objects 114.

FIGS. 2A and 2B illustrates an example of operations related to generating a data mapping 126 by a data extraction, object creation and query system (DQS) 102, according to some embodiments. In some embodiments, a request 112 may be received to generate multiple data objects 114 at the same time. As illustrated in FIG. 2A, file 106 may include a spreadsheet file 200 with various rows of data, each row corresponding to a different record or data object 114 to be created.

Data extractor 118 may extract a string of raw data 104 from the spreadsheet file. Prompt generator 120 may generate prompt 122 indicating to generate multiple data objects 114 from the raw data 104. Or an indicated above, prompt generator 120 may provide a pointer to file 106, and as part of its processing, LLM 124 may include its own data extractor 118 functionality which may extract the data from file 106 as raw data 104. LLM 124 may then perform or generate the mapping 126.

LLM 124 may return the mapping 126 to DQS 102, which may format the mapping 126 for display 220 (and modification) as illustrated in FIG. 2B. Display 220 illustrates three different data objects 114 to be created, where the user has the option of editing any of the mapped data. Upon making any modifications 132, the user may select "save draft" which may trigger DQS 102 to generate three corresponding data objects 114 in storage system 108. As illustrated, some of the data appears in a different order (relative to the spreadsheet of FIG. 2A), and some data has been omitted.

Figure 3:
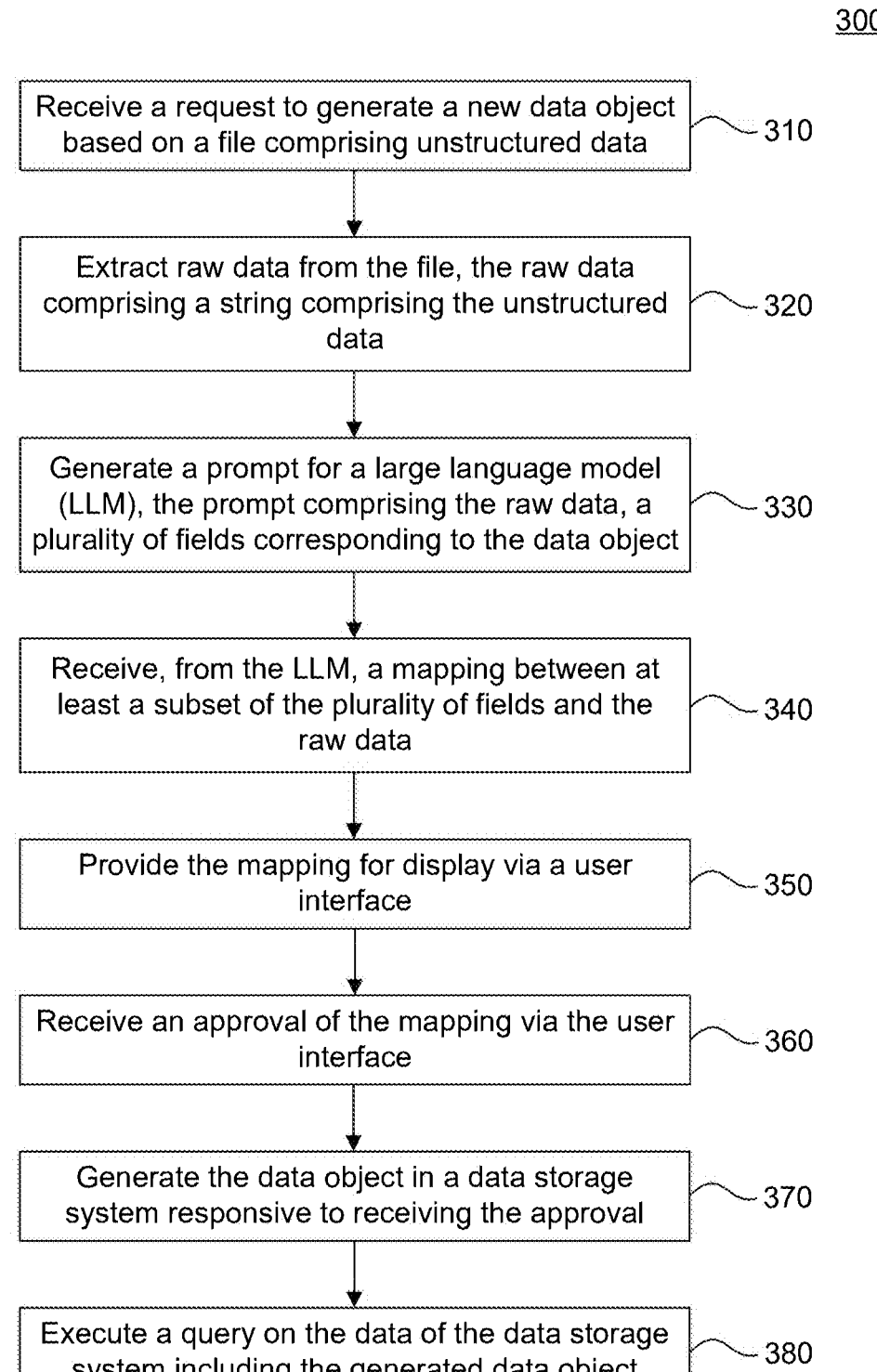
FIG. 3 is a flowchart illustrating example operations of a data extraction, object creation and query system (DQS), according to some embodiments.

FIG. 3 is a flowchart 300 illustrating example operations of a data extraction, object creation and query system (DQS) 102, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Without limiting method 300, method 300 is described with reference to elements in FIG. 1.

At 310, a request to generate a new data object based on a file comprising unstructured data is received. For example, DQS 102 may receive request 112 requesting to add or update a data object 114 in storage system 108, in accordance with file 106.

At 320, raw data is extracted from the file, the raw data comprising a string comprising the unstructured data. For example, data extractor 118 may extract raw data (e.g., as a text string) from the file 106. In some embodiments, data extraction may include performing OCR processing on an image file 106.

At 330, a prompt for a large language model (LLM) is generated, the prompt comprising the raw data, a plurality of fields corresponding to the data object. For example, prompt generator 120 may generate prompt 122. The prompt 122 may indicate which data object(s) 114 (and/or fields 115) to generate from the raw data 104. In some embodiments, prompt 122 may include the file 106 (e.g., or a pointer or address thereto) and/or the raw data 104. In some embodiments, prompt generator 120 may copy a definition of the data object(s) 114 from the API 134 (e.g., the definition including various fields 115 which may correspond to data from file 106) and include the definition in prompt 122.

LLM 124 may then use the definition included in the prompt 122 to perform and generate the mapping 126.

At 340, a mapping between at least a subset of the plurality of fields and the raw data is received from the LLM. For example, DQS 102 may receive mapping 126 from LLM 124. The mapping 126 may include an indication of how raw data 104 was mapped to one or more fields 115 across one or more data objects 114, which are to be created and/or updated in storage system 108.

At 350, the mapping is provided for display via a user interface. For example, DQS 102 may format the mapping 126 for display via user interface 128 for user review/ rejection/approval 130/modification 132. As also illustrated in FIG. 2B.

At 360, an approval of the mapping is received via the user interface. For example, DQS 102 may receive an approval 130 of the mapping 126.

At 370, the data object is generated in a data storage system responsive to receiving the approval. For example, DQS 102 may call API 134 to generate or update the data object(s) 114 in accordance with the approved mapping 126.

At 380, a query is executed on the data of the data storage system including the generated data object. For example, DQS 102 may execute a query 110 against the data of storage system 108, including the new or updated data object 114, and generate and return a query response 136.

Figure 4:
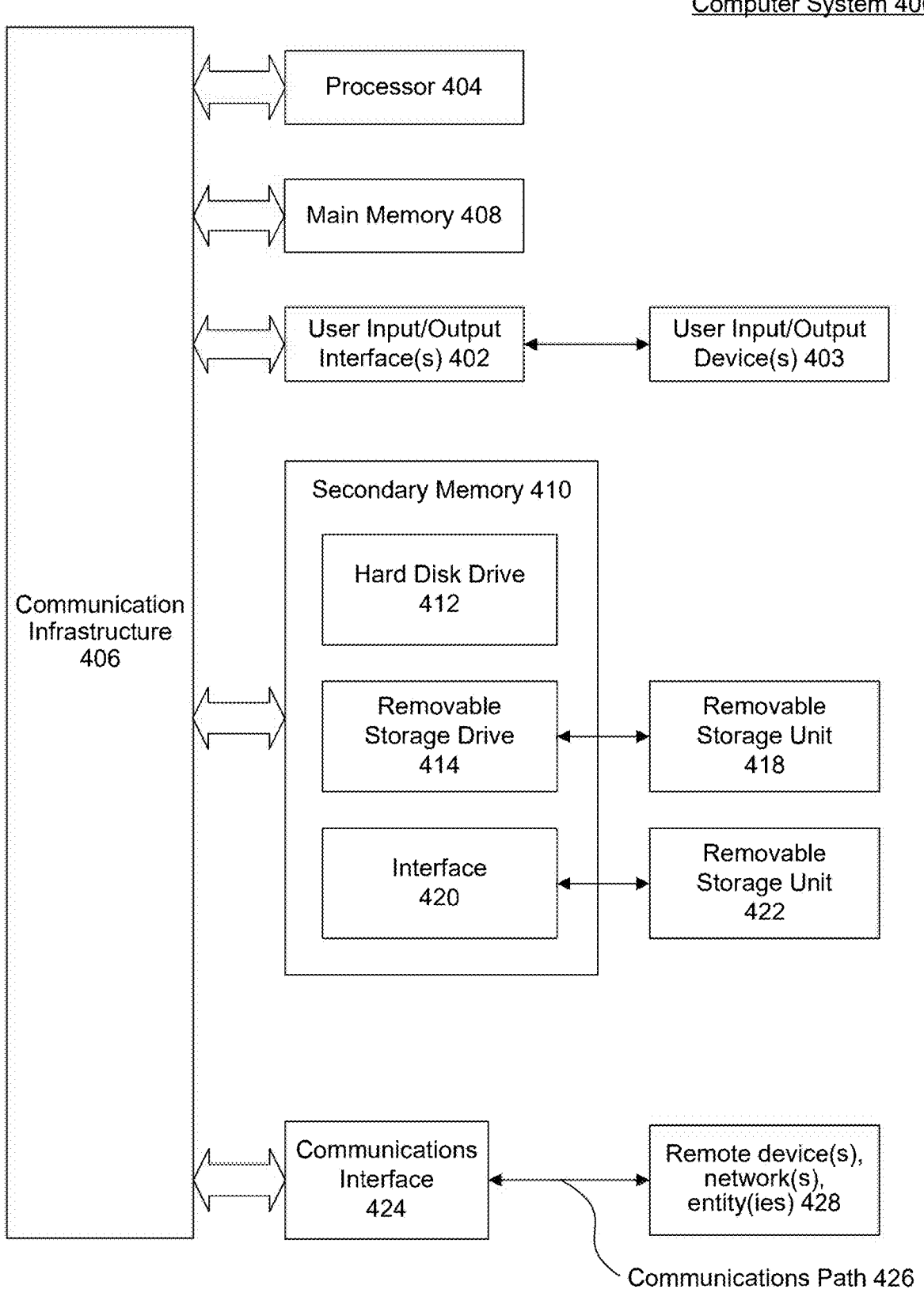
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/ output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:

receiving a request to generate a new data object based on a file comprising unstructured data;

extracting raw data from the file, the raw data comprising a string comprising the unstructured data;

generating a prompt for a large language model (LLM), the prompt comprising the raw data and a plurality of fields corresponding to the new data object;

receiving, from the LLM in accordance with the prompt, a mapping, the mapping comprising assignments between at least a subset of the plurality of fields and the raw data;

providing the mapping for display via a user interface;

receiving an approval of the assignments in the mapping via the user interface; and generating, in accordance with the mapping, the new data object in a data storage system responsive to receiving the approval.

2. The computer-implemented method of claim 1, further comprising:

receiving a query to execute against the data storage system prior to generating the new data object, the query identifying a first data object;

determining that the first data object corresponds to the new data object corresponding to the request;

executing the query prior to the generating the new data object;

providing a first query response based on executing the query prior to the generating the new data object;

executing the query after the generating the new data object; and providing a second query response based on executing the query after the generating the new data object.

3. The computer-implemented method of claim 1, further comprising:

identifying an application programming interface (API) associated with the new data object, the API including the plurality of fields of the new data object.

4. The computer-implemented method of claim 3, wherein the generating the new data object comprises:

calling a function of the API configured to generate and store the new data object in the data storage system based on the mapping.

5. The computer-implemented method of claim 3, wherein the generating the prompt comprises:

determining that the API includes a definition for a plurality of data objects, including the new data object associated with the request; and copying the definition for the new data object associated with the request from the API into the prompt.

6. The computer-implemented method of claim 1, wherein the receiving the approval comprises:

receiving, via the user interface, a modification to the mapping, wherein the approval comprises an approval of the mapping including the modification, and wherein the new data object includes the modification.

7. The computer-implemented method of claim 1, wherein the extracting comprises:

determining that the file is an image document; and performing optical character recognition on the image document to generate the raw data.

8. The method of claim 1, wherein the generating the prompt comprises:

determining the request identifies a plurality of data objects to be generated from the file; and generating the prompt for the LLM, the prompt comprising the raw data, each of the plurality of data objects and each of the plurality of fields corresponding to each of the plurality of data objects.

9. A system comprising:

a memory; and at least one processor coupled to the memory and configured to perform operations comprising:

receiving a request to generate a new data object based on a file comprising unstructured data;

extracting raw data from the file, the raw data comprising a string comprising the unstructured data;

generating a prompt for a large language model (LLM), the prompt comprising the raw data and a plurality of fields corresponding to the new data object;

receiving, from the LLM in accordance with the prompt, a mapping, the mapping comprising assignments between at least a subset of the plurality of fields and the raw data;

providing the mapping for display via a user interface;

receiving an approval of the assignments in the mapping via the user interface; and generating, in accordance with the mapping, the new data object in a data storage system responsive to receiving the approval.

10. The system of claim 9, the operations further comprising:

receiving a query to execute against the data storage system prior to generating the new data object, the query identifying a first data object;

determining that the first data object corresponds to the new data object corresponding to the request;

executing the query prior to the generating the new data object;

providing a first query response based on executing the query prior to the generating the new data object;

executing the query after the generating the new data object; and providing a second query response based on executing the query after the generating the new data object.

11. The system of claim 9, the operations further comprising:

identifying an application programming interface (API) associated with the new data object, the API including the plurality of fields of the new data object.

12. The system of claim 11, wherein the generating the new data object comprises:

calling a function of the API configured to generate and store the new data object in the data storage system based on the mapping.

13. The system of claim 11, wherein the generating the prompt comprises:

determining that the API includes a definition for a plurality of data objects, including the new data object associated with the request; and copying the definition for the new data object associated with the request from the API into the prompt.

14. The system of claim 9, wherein the receiving the approval comprises:

receiving, via the user interface, a modification to the mapping, wherein the approval comprises an approval of the mapping including the modification, and wherein the new data object includes the modification.

15. The system of claim 9, wherein the extracting comprises:

determining that the file is an image document; and performing optical character recognition on the image document to generate the raw data.

16. The system of claim 9, wherein the generating the prompt comprises:

determining the request identifies a plurality of data objects to be generated from the file; and generating the prompt for the LLM, the prompt comprising the raw data, each of the plurality of data objects and each of the plurality of fields corresponding to each of the plurality of data objects.

17. A non-transitory computer-readable medium having instructions stored thereon that, when executed by at least one computing device, cause the at least one computing device to perform operations comprising:

receiving a request to generate a new data object based on a file comprising unstructured data;

extracting raw data from the file, the raw data comprising a string comprising the unstructured data;

generating a prompt for a large language model (LLM), the prompt comprising the raw data and a plurality of fields corresponding to the new data object;

receiving, from the LLM in accordance with the prompt, a mapping, the mapping comprising assignments between at least a subset of the plurality of fields and the raw data;

providing the mapping for display via a user interface;

receiving an approval of the assignments in the mapping via the user interface; and generating, in accordance with the mapping, the new data object in a data storage system responsive to receiving the approval.

18. The non-transitory computer-readable medium of claim 17, the operations further comprising:

receiving a query to execute against the data storage system prior to generating the new data object, the query identifying a first data object;

determining that the first data object corresponds to the new data object corresponding to the request;

executing the query prior to the generating the new data object;

providing a first query response based on executing the query prior to the generating the new data object;

executing the query after the generating the new data object; and providing a second query response based on executing the query after the generating the new data object.

19. The non-transitory computer-readable medium of claim 17, the operations further comprising:

identifying an application programming interface (API) associated with the new data object, the API including the plurality of fields of the new data object.

20. The non-transitory computer-readable medium of claim 19, wherein the generating the new data object comprises:

calling a function of the API configured to generate and store the new data object in the data storage system based on the mapping.

* * * * *